United States Patent
Shin et al.

(10) Patent No.: US 10,066,684 B2
(45) Date of Patent: Sep. 4, 2018

(54) PAD LINER FOR REDUCING DRAG IN BRAKE CALIPER

(71) Applicants: HYUNDAI MOTOR COMPANY, Seoul (KR); Kia Motors Corporation, Seoul (KR); HYUNDAI MOBIS CO., LTD., Seoul (KR)

(72) Inventors: Ju-Hoon Shin, Suwon-si (KR); Jae-Whan Shim, Seongnam-si (KR)

(73) Assignees: HYUNDAI MOTOR COMPANY, Seoul (KR); KIA MOTORS CORPORATION, Seoul (KR); HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 14/939,927

(22) Filed: Nov. 12, 2015

(65) Prior Publication Data

US 2016/0195148 A1    Jul. 7, 2016

(30) Foreign Application Priority Data

Jan. 16, 2015    (KR) .................. 10-2015-0001095

(51) Int. Cl.
*F16D 55/225* (2006.01)
*F16D 65/09* (2006.01)
*F16D 65/097* (2006.01)
*F16D 55/00* (2006.01)

(52) U.S. Cl.
CPC ....... *F16D 55/225* (2013.01); *F16D 65/0972* (2013.01); *F16D 2055/0029* (2013.01)

(58) Field of Classification Search
CPC .................. F16D 65/0977; F16D 65/0972

USPC ........................................ 188/73.38
See application file for complete search history.

(56) References Cited

U.S. PATENT DOCUMENTS

| | | | | | |
|---|---|---|---|---|---|
| 5,249,647 | A | * | 10/1993 | Kobayashi | F16D 65/092 188/72.3 |
| 5,687,817 | A | * | 11/1997 | Kobayashi | F16D 65/097 188/72.3 |
| 5,901,815 | A | * | 5/1999 | Kobayashi | F16D 65/0977 188/205 A |
| 5,934,417 | A | * | 8/1999 | Kobayashi | F16D 55/227 188/1.11 W |

(Continued)

FOREIGN PATENT DOCUMENTS

| | | |
|---|---|---|
| JP | 6-4436 U | 1/1994 |
| JP | 2007-271064 A | 10/2007 |

(Continued)

*Primary Examiner* — Bradley T King
*Assistant Examiner* — James K Hsiao
(74) *Attorney, Agent, or Firm* — McDermott Will & Emery LLP

(57) ABSTRACT a pad liner for reducing drag in a brake caliper, provided in a vehicle brake which has a caliper receiving a portion of a brake disc rotating along with a wheel and pads installed so as to respectively press both surfaces of the brake disc when a brake pedal is operated in the caliper, the pad liner being installed in the caliper to provide elastic force such that the pads are spaced apart from the brake disc. The pad liner further includes elastic parts which obliquely extend from the pad liner and come into oblique contact with ends of the pads such that the pads are spaced apart from the brake disc when the operation of the brake pedal is completed.

7 Claims, 11 Drawing Sheets

(56) References Cited

U.S. PATENT DOCUMENTS

| | | | | |
|---|---|---|---|---|
| 5,947,233 | A * | 9/1999 | Kobayashi | F16D 55/227 188/1.11 W |
| 6,378,666 | B1 * | 4/2002 | Yoko | F16D 65/0977 188/73.36 |
| 6,527,090 | B1 * | 3/2003 | Barillot | F16D 65/0978 188/73.1 |
| D473,127 | S * | 4/2003 | Yoko | D8/395 |
| D489,655 | S * | 5/2004 | Byrd | D12/180 |
| 7,308,974 | B2 * | 12/2007 | Barbosa | F16D 65/095 188/72.3 |
| 8,376,092 | B2 | 2/2013 | Lethorn | |
| 8,776,959 | B2 * | 7/2014 | Kaneko | F16D 65/0977 188/73.31 |
| 9,388,869 | B2 * | 7/2016 | Zhang | F16D 65/0972 |
| 2004/0144602 | A1 * | 7/2004 | Ono | F16D 65/0971 188/71.7 |
| 2005/0274579 | A1 * | 12/2005 | Nogiwa | F16D 65/0977 188/73.38 |
| 2006/0070828 | A1 * | 4/2006 | Hendrich | F16D 65/0972 188/73.31 |
| 2006/0260884 | A1 * | 11/2006 | Hayashi | F16D 65/0977 188/71.1 |
| 2006/0260885 | A1 * | 11/2006 | Maehara | F16D 65/0972 188/71.1 |
| 2007/0227839 | A1 | 10/2007 | Barrett et al. | |
| 2007/0246312 | A1 * | 10/2007 | Bach | F16D 65/0972 188/73.31 |
| 2007/0251772 | A1 * | 11/2007 | Tsurumi | F16D 65/095 188/73.38 |
| 2010/0051393 | A1 * | 3/2010 | Arioka | F16D 65/0972 188/72.3 |
| 2010/0243385 | A1 * | 9/2010 | Kaneko | F16D 65/0977 188/73.31 |
| 2010/0243389 | A1 * | 9/2010 | Miura | F16D 65/0977 188/206 R |
| 2011/0073418 | A1 * | 3/2011 | Kim | F16D 65/0972 188/73.43 |
| 2011/0168503 | A1 * | 7/2011 | Chelaidite | F16D 65/0972 188/73.31 |
| 2012/0186917 | A1 * | 7/2012 | Gutelius | F16D 65/0972 188/72.3 |
| 2012/0205205 | A1 * | 8/2012 | Lethorn | F16D 65/0972 188/234 |
| 2013/0025981 | A1 * | 1/2013 | Maehara | F16D 55/227 188/72.3 |
| 2014/0305753 | A1 * | 10/2014 | MacY | F16D 65/0972 188/216 |
| 2014/0305754 | A1 * | 10/2014 | Bernard | F16D 65/0972 188/250 E |
| 2014/0326548 | A1 * | 11/2014 | Merrien | F16D 65/0006 188/73.38 |
| 2014/0339026 | A1 * | 11/2014 | Gutelius | F16D 65/0973 188/72.3 |
| 2014/0374202 | A1 * | 12/2014 | Mahoudeaux | F16D 55/2262 188/250 E |
| 2015/0021127 | A1 * | 1/2015 | Miura | F16D 65/0977 188/73.38 |
| 2015/0107944 | A1 * | 4/2015 | Mallmann | F16D 65/0972 188/73.38 |

FOREIGN PATENT DOCUMENTS

| | | |
|---|---|---|
| JP | 2008-298198 A | 12/2008 |
| JP | 2009-209961 A | 9/2009 |
| KR | 10-0349542 B1 | 8/2002 |
| KR | 10-2013-0003932 A | 1/2013 |
| KR | 10-2013-0134557 A | 12/2013 |

* cited by examiner

⇒ : SEAL RESTORATION
→ : PAD LINER RESTORING FORCE

PAD LINER FOR REDUCING DRAG IN BRAKE CALIPER

CROSS-REFERENCE TO RELATED APPLICATIONS

This application claims the benefit of priority to Korean Patent Application No. 10-2015-0001095, filed on Jan. 6, 2015, which is incorporated herein by reference in its entirety.

TECHNICAL FIELD

The present disclosure relates to a pad liner which separates brake pads from a brake disc in a vehicle brake. More particularly, the present disclosure relates to a pad liner for reducing drag in a brake caliper, which provides restoring force such that brake pads are separated from a brake disc after a braking operation and prevents foreign substances generated during the braking operation from being deposited therein.

BACKGROUND

Among brakes applied to a vehicle, there is a disc brake which serves to stop a wheel in which brake pads 14 grip a brake disc 12 which rotates along with the wheel as shown in FIGS. 1 and 2.

The disc brake includes a piston 15 mounted in a caliper 13 and pressed by a hydraulic pressure generated when a driver operates a brake pedal. The piston 15 pushes the brake pads 14 installed in the caliper 13 toward the brake disc 12. The brake pads 14 operated by the piston 15 grip the brake disc 12 which rotates along with the wheel in which the brake disc 12 and the wheel are connected to the same axle 11 in the caliper 13, thereby stopping rotation of the wheel by frictional force between the brake pads 14 and the brake disc 12.

When the braking operation is completed, it is necessary to separate the brake pads 14 from the brake disc 12 and to form gaps between the brake pads 14 and the brake disc 12, while the piston 15 is restored to an original position, such that the wheel may rotate without undergoing resistance due to contact between the brake pads 14 and the brake disc 12.

However, a drag phenomenon according to a run-out or change in thickness of the brake disc 12 occurs, that is, a phenomenon in which the brake pads 14 disturb the rotation of the brake disc 12 occurs since restoring force of the brake pads 14 is insufficient.

In order to prevent the above drag phenomenon, a pad liner 121 or 122 which serves as a spring is installed in the caliper 13 as shown in FIGS. 3 and 4. Thus, the pad liner 121 or 122 enables the brake pads 14 to be fully separated from the brake disc 12 when a hydraulic pressure for braking is removed therefrom.

However, the conventional pad liner 121 or 122 interferes with the brake disc 12 due to detachment from the caliper 13 and does not prevent foreign substances generated during the braking operation from being deposited therein or corrosion.

For example, the pad liner 121 shown in FIG. 3 supports the brake pads 14 by a constant load and provides restoring force to the brake pads 14. The pad liner 121 is fixed into the caliper 13 in a clip form or is coupled to the caliper 13 to form a locking protrusion at an upper portion thereof. However, when the pad liner 121 is not fully assembled to the caliper 13, the pad liner 121 is detached from the caliper 13, thereby interfering with the brake disc 12.

In addition, the pad liner 122 shown in FIG. 4 has elastic parts 122a so as to increase the restoring force of the brake pads 14 with respect to the caliper 13. However, when foreign substances are deposited in the elastic parts 122a, the pads 14 do not press the brake disc 12 during the braking operation. For this reason, the pad liner 122 cannot provide a sufficient braking force.

FIG. 5 illustrates decomposition of the pads and the pad liners in FIG. 4.

SUMMARY

An aspect of the present inventive concept is directed to a pad liner for reducing drag in a brake caliper, which is capable of providing restoring force such that brake pads are spaced apart from a brake disc when braking is completed, thus decreasing drive resistance due to interference between the brake pads and the brake disc.

Another aspect of the present inventive concept is directed to a pad liner for reducing drag in a brake caliper, which is capable of preventing detachment from a caliper after the pad liner is mounted in the caliper without using a separate locking structure.

Another aspect of the present inventive concept is directed to a pad liner for reducing drag in a brake caliper, which enables foreign substances generated by braking or corrosion to be easily discharged to outside.

Other objects and advantages of the present inventive concept can be understood by the following description, and become apparent with reference to the embodiments of the present inventive concept. It is obvious to those skilled in the art to which the present inventive concept pertains that the objects and advantages of the present inventive concept can be realized by the means as claimed and combinations thereof.

In accordance with an embodiment of the present inventive concept, a pad liner for reducing drag in a brake caliper for a vehicle brake, in which the vehicle brake includes a caliper in which a portion of a brake disc rotates along with a wheel and brake pads respectively pressing both surfaces of the brake disc when a brake pedal is operated in the caliper, comprises elastic parts which obliquely extend from the pad liner and come into oblique contact with ends of the brake pads such that the brake pads are spaced apart from the brake disc when the operation of the brake pedal is completed. The pad liner is disposed inside the caliper and provides an elastic force such that the brake pads are spaced apart from the brake disc.

The pad liner may include a main body and extension parts which extend from the main body and are spaced apart from the main body. The elastic parts may be formed at the extension parts.

The pad liner may further include a connection part connecting an upper end of the main body to upper ends of the extension parts.

The extension parts may be connected to the ends of the connection part in a width direction of the pad liner.

Each of the elastic parts may be inclined from the associated extension part at a set angle.

Each of the elastic parts may be inclined from the extension part to be further spaced apart from the extension part toward an inner side of the pad liner.

Each of the elastic parts may be formed by cutting the extension part in a width direction of the pad liner.

The elastic part may be formed by forming a U-groove at a middle portion of the extension part and obliquely bending a center portion thereof.

Each of the extension parts may be spaced apart from the main body at a predetermined distance.

The extension parts may support side surfaces of the brake pads such that the brake pads are spaced apart from the brake disc when the extension parts press the side surfaces of the brake pads by a constant load.

The main body may have pad locking parts which are bent in a "U" form at a middle portion of the main body and which are fixed to side surfaces of the brake pads.

DETAILED DESCRIPTION

Figure 1:
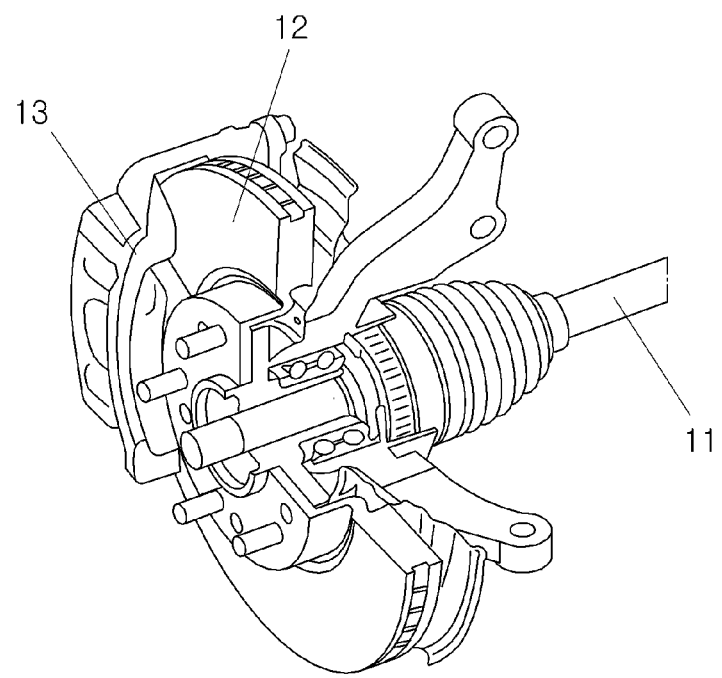
FIG. 1 is a partially cut perspective view illustrating a typical disc brake.

A pad liner for reducing drag in a brake caliper according to exemplary embodiments of the present inventive concept will be described below in more detail with reference to the accompanying drawings. The present inventive concept may, however, be embodied in different forms and should not be construed as limited to the embodiments set forth herein. Rather, these embodiments are provided so that this disclosure will be thorough and complete, and will fully convey the scope of the present inventive concept to those skilled in the art. Throughout the disclosure, like reference numerals refer to like parts throughout the various figures and embodiments of the present inventive concept.

Figure 2:
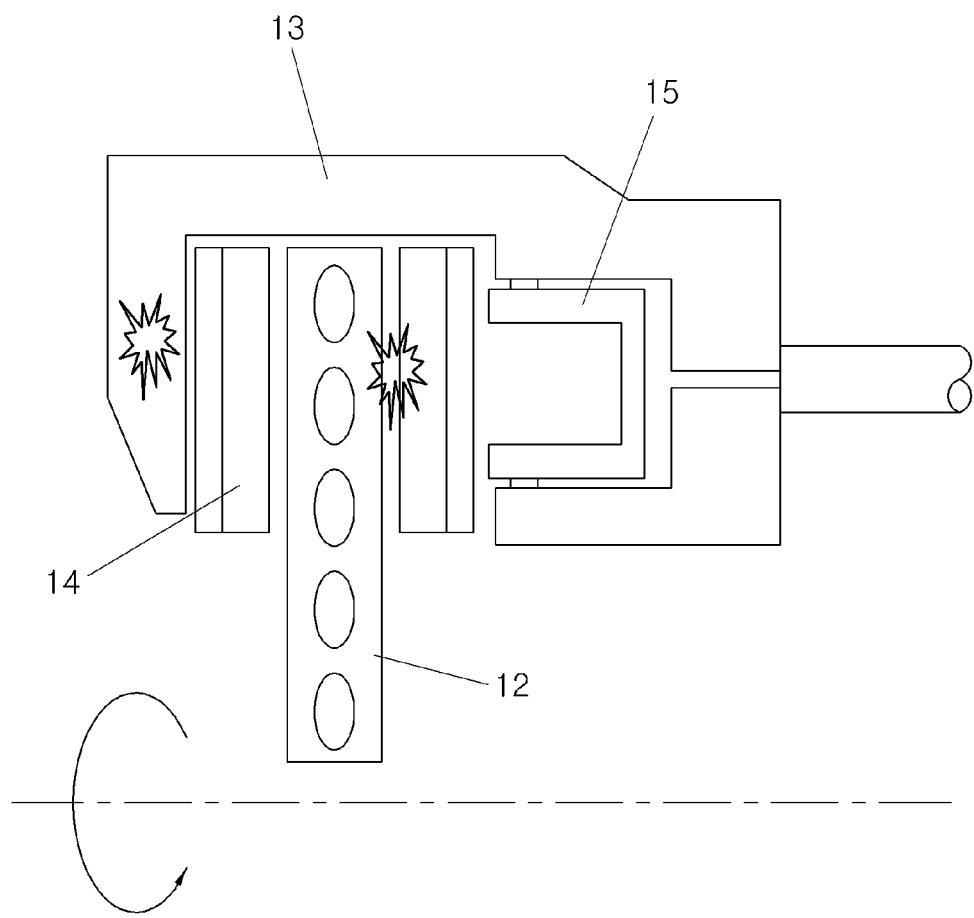
FIG. 2 is a top view illustrating an operation principle of the brake in FIG. 1.
Figure 3:
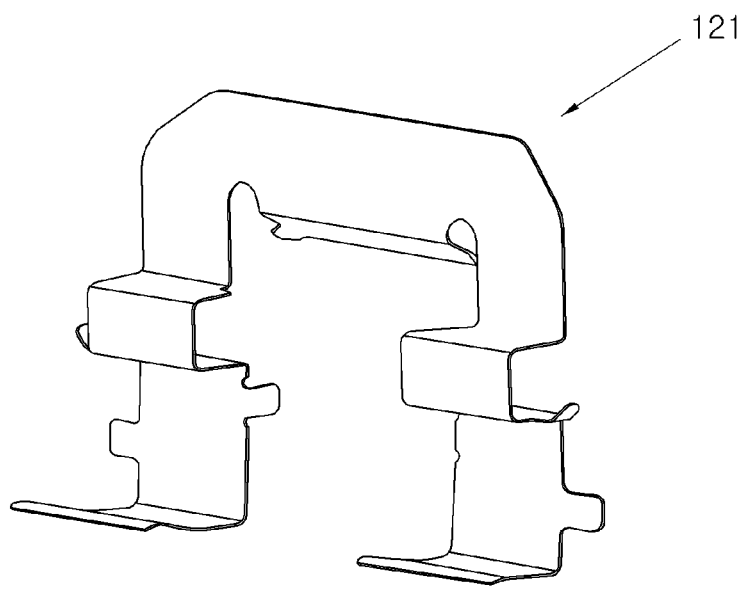
FIG. 3 is a perspective view illustrating one pad liner according to an example of the related art.
Figure 4:
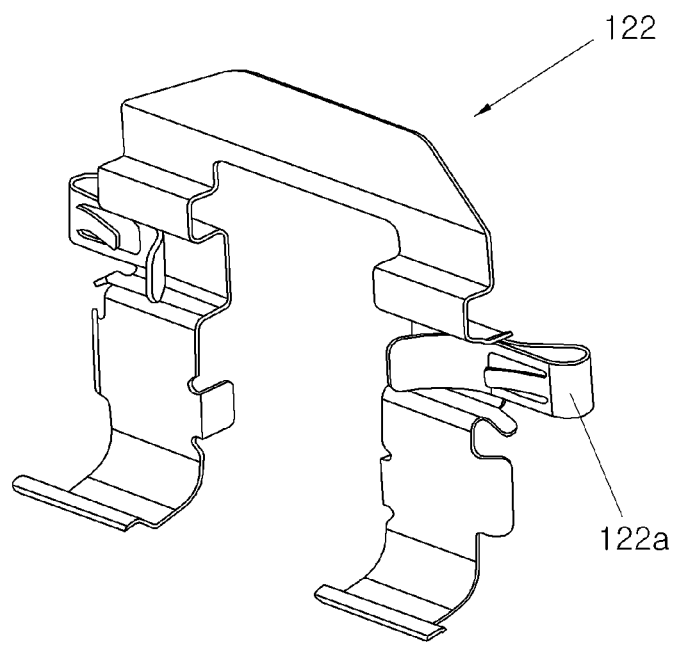
FIG. 4 is a perspective view illustrating one pad liner according to another example of the related art.
Figure 5:
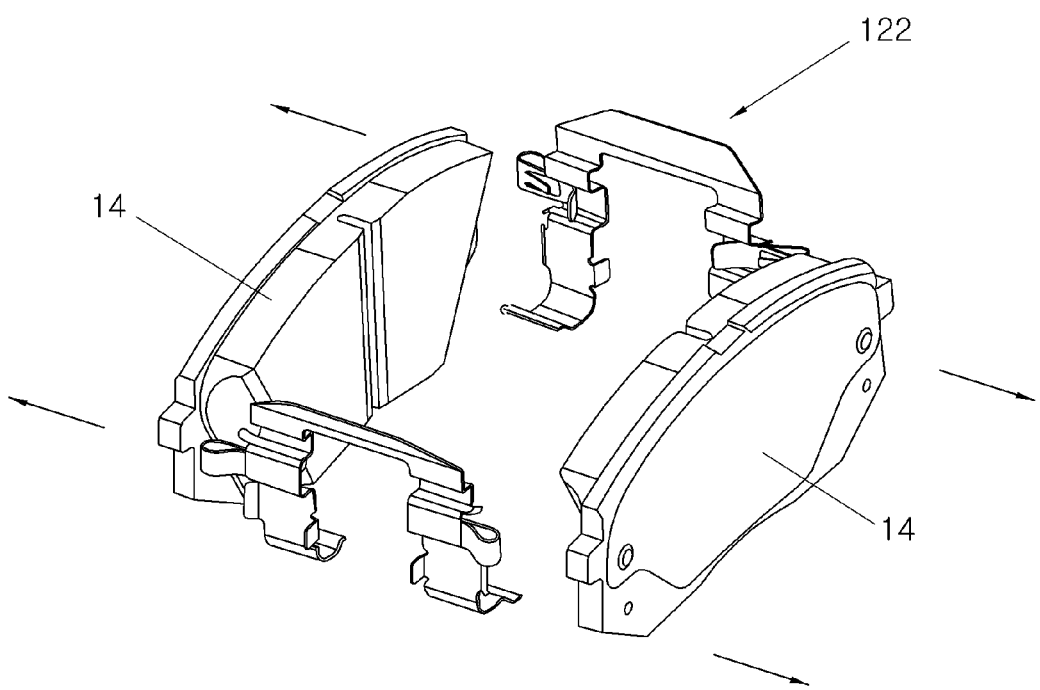
FIG. 5 is a perspective view illustrating decomposition of pads and the pad liners in FIG. 4.
Figure 6:
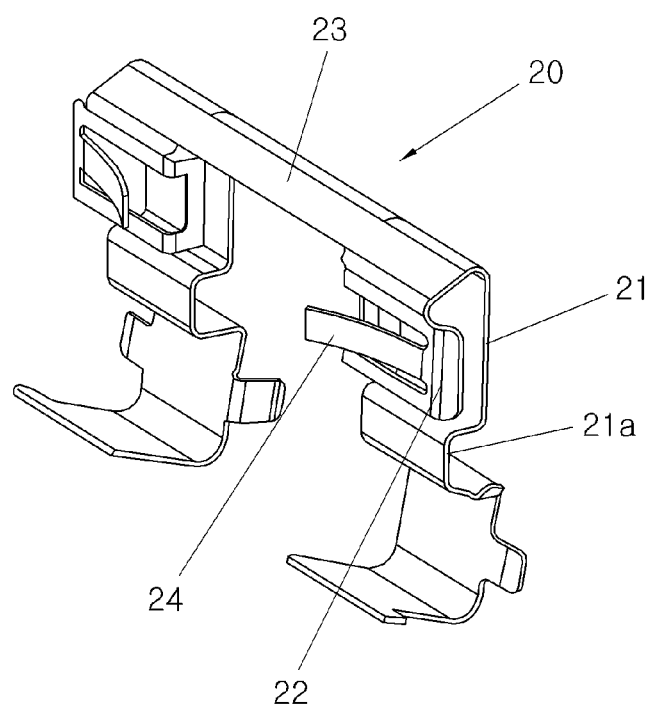
FIG. 6 is a perspective view illustrating one pad liner for reducing drag in a brake caliper according to an embodiment of the present inventive concept.

With reference to FIGS. 1, 2, and 6, in a vehicle brake which includes a caliper 13 for receiving a portion of a brake disc 12 which rotates along with a wheel. Brake pads 14 are installed so as to respectively press both surfaces of the brake disc 12 when a brake pedal is operated in the caliper 13. A pad liner 20 for reducing drag in a brake caliper according to the present disclosure is installed in the caliper 13 to provide elastic force such that the brake pads 14 are spaced apart from the brake disc 12. The pad liner 20 includes elastic parts 24 which obliquely extend and come into oblique contact with ends of the brake pads 14 such that the brake pads 14 are spaced apart from the brake disc 12 when the operation of the brake pedal is completed.

As shown in FIG. 6, the pad liner includes a main body 21, extension parts 22 extending from the main body 21, and elastic parts 24 obliquely extending from the extension parts 22.

The main body 21 may include other components in the pad liner 20. For example, the extension parts 22 extend from the main body 21. The main body 21 may have pad locking parts 21a or the like formed at a middle portion in a length direction, and each of the pad locking parts 21a is bent in a "U" form such that the associated brake pad 14 is coupled to the pad liner 20.

Each of the extension parts 22 extends from an upper end of the main body 21 and is spaced apart from the main body 21 by a predetermined distance.

Figure 7:
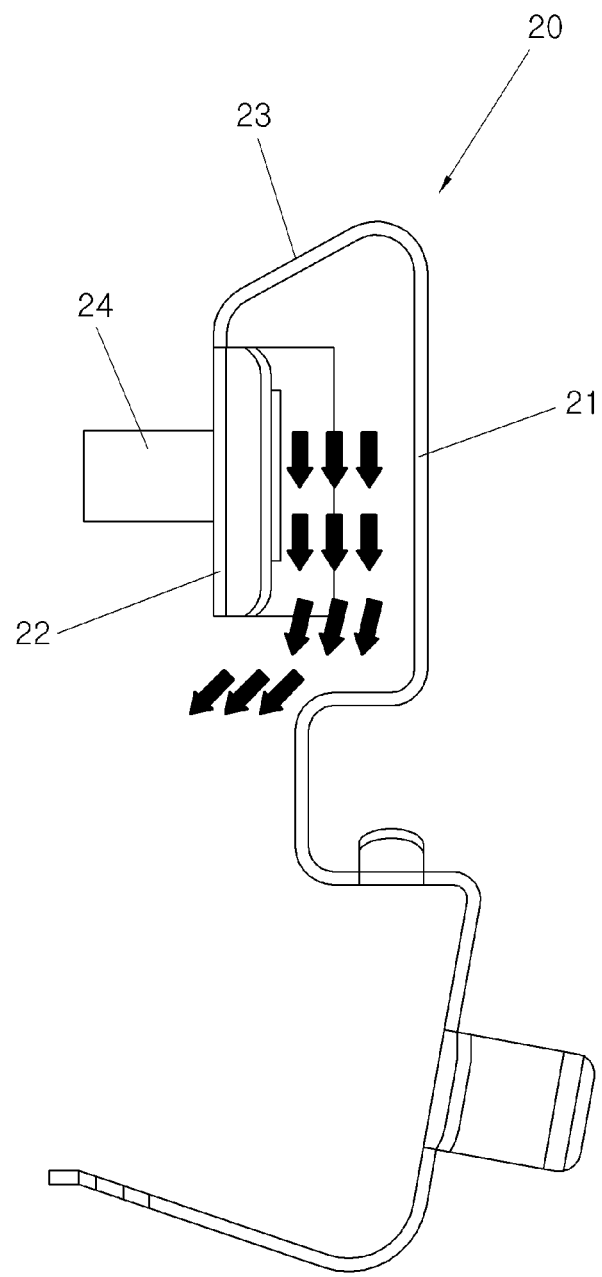
FIG. 7 is a side view illustrating the pad liner for reducing drag in a brake caliper according to the embodiment of the present inventive concept.
Figure 8:
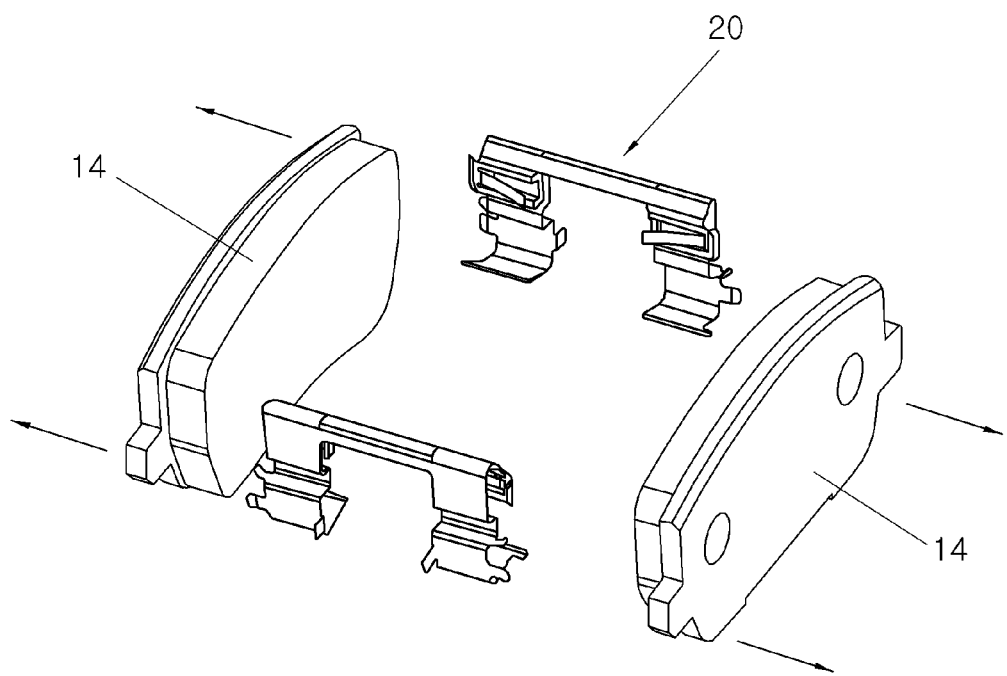
FIG. 8 is a perspective view illustrating decomposition of pads and the pad liners for reducing drag in a brake caliper according to the embodiment of the present inventive concept.

Upper ends of the extension parts 22 are connected to the upper end of the main body 21 through a connection part 23. A cross-section connecting the main body 21, the connection part 23, and the extension parts 22 has an inverse "U" form as shown in FIG. 7. Each extension part 22 extends downward from the connection part 23 in an opposite side of the main body 21.

In particular, a lower portion of the space between the extension part 22 and the main body 21 is opened. Thus, when foreign substances are introduced into the extension part 22 and the main body 21, the foreign substances are immediately discharged (see FIG. 7_.

In addition, the extension parts 22 are connected to an end portion of the connection part 23. The end portion of the main body 21 is a portion in which the brake disc 12 is installed and rotates, and the extension parts 22 are not directly connected to the main body 21, thus supporting side surfaces of the brake pads 14.

The extension parts 22 generate a reaction force by supporting the brake pads 14 at an upper side of the pad liner 20 so as to prevent detachment of the pad liner 20 due to a braking operation, vibration, and the like.

Each of the elastic parts 24 obliquely extends from one side of the associated extension part 22. One end of each of the elastic part 24 is connected to the extension part 22, and another end thereof extends from the one end of the elastic part 24 and is not connected to the extension part 22. That is, the elastic parts 24 are inclined with respect to the extension parts 22 by a predetermined angle, thereby exhibiting elastic force.

The elastic part 24 may be formed by cutting the extension part 22 in a width direction of the pad liner 20. That is, the elastic part 24 may be formed by forming a U-groove at a middle portion of the extension part 22 and obliquely bending.

The other end of the elastic part 24 is located at an outer side of the pad liner 20, and the one end thereof is located in the pad liner 20. In particular, since the elastic parts 24 come into contact with the ends of the brake pads 14 in an inclined state, the elastic force may act on the brake pads 14.

The elastic parts 24 are formed such that the brake pads 14 are spaced apart from the brake disc 12 when the elastic parts 24 are installed in the caliper 13.

The pad liner 20 has a space in which the brake disc 12 rotates, and the pad liner 20 has a left-right symmetric structure about the space.

In addition, both ends of the brake pads 14 respectively have the pad liner 20. That is, in the caliper 13 of the vehicle brake, the pad liners 20 are arranged such that friction surfaces of the brake pads 14 respectively face both surfaces of the brake disc 12, and the friction surfaces of the brake pads 14 face the brake disc 12.

Therefore, two brake pads 14 and two pad liners 20 are provided in one caliper 13.

Hereinafter, an operation of the pad liner for reducing drag in a brake caliper according to the present invention will be described.

Figure 9:
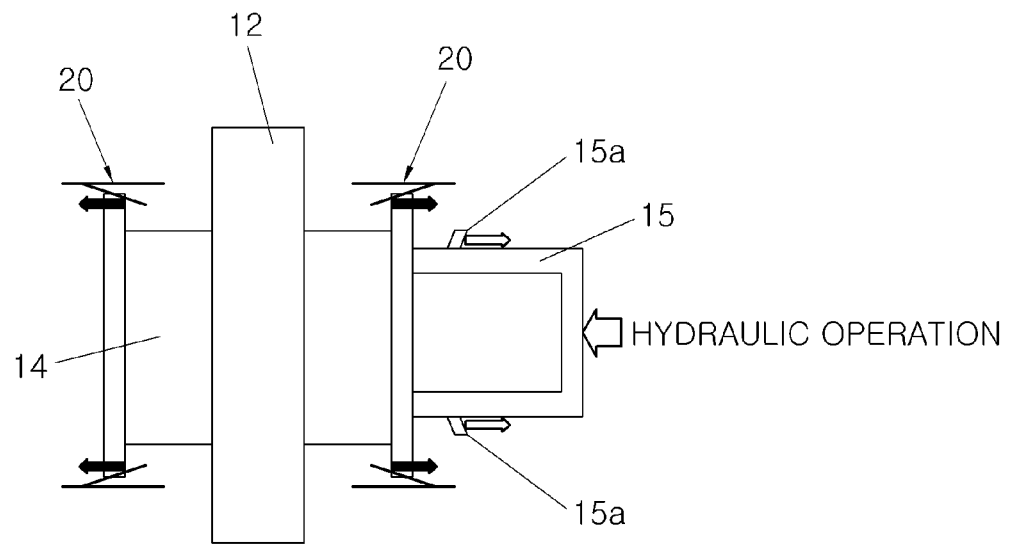
FIGS. 9 and 10 are views schematically illustrating restoring force according to whether or not a hydraulic pressure is activated.
Figure 10:
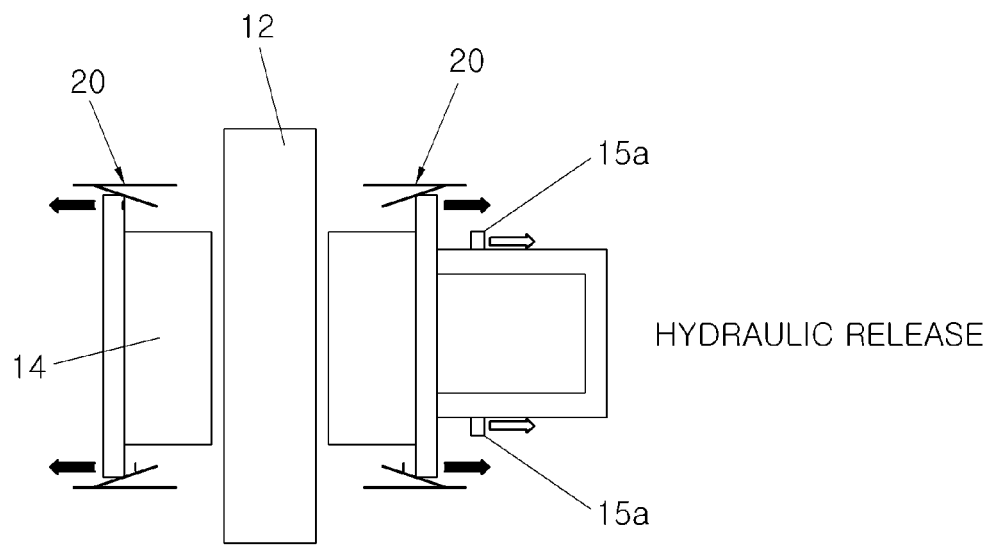

FIGS. 9 and 10 show respective states during a braking operation and a braking release.

First, a braking operation state will be described with reference to FIG. 9. When a driver operates the brake pedal, a hydraulic pressure is transferred to the caliper 13. A piston 15 is pressed to the brake disc 12 by the hydraulic pressure and the brake pads 14 grip the brake disc 12, thereby generating braking force. In this case, restoring force by the pad liner 20 for restoring the brake pads 14 between the elastic parts 24 and the brake pads 14 and restoring force by a sealing 15a sealing a gap between the piston 15 and the caliper 13 act in an opposite direction of the hydraulic pressure. However, since the hydraulic pressure has a magnitude greater than the above restoring force, the brake pads 14 are pressurized toward the brake disc 12 so that the braking force is generated.

FIG. 10 shows a braking release state. When the driver does not operate the brake pedal, the hydraulic pressure does not act on the piston 15. Here, the elastic force by the elastic parts 24 of the pad liner 20 acts as the restoring force for restoring the brake pads 14, so that the brake pads 14 are fully spaced apart from the brake disc 12. In addition, since the restoring force also acts on an installation portion of the sealing 15a, the pads 14 are fully spaced apart from the brake disc 12, thereby preventing a drag phenomenon due to interference between the brake pads 14 and the brake disc 12.

In addition, as shown in FIG. 7, the extension part 22 is formed in the pad liner 20 such that the extension part 22 is spaced apart from the main body 21. Therefore, it is possible to prevent foreign substances from being introduced into the brake during traveling of the vehicle or to prevent foreign substances generated by abrasion of the brake pads 14 and brake disc 12 during the braking operation from being introduced into the brake. In addition, it is possible to prevent foreign substances generated by corrosion of components of the brake from being deposited in the pad liner 20. That is, the foreign substances introduced into the pad liner 20 are easily discharged to the outside of the pad liner 20, as indicated by the arrows in FIG. 7. Thus, the foreign substances are not deposited in the pad liner 20.

By preventing the foreign substance from being deposited in the pad liner 20, it is possible to prevent malfunction of the brake in which the pad liner 20 is not properly operated due to the foreign substances. Thus, the brake may have improved reliability.

Figure 11:
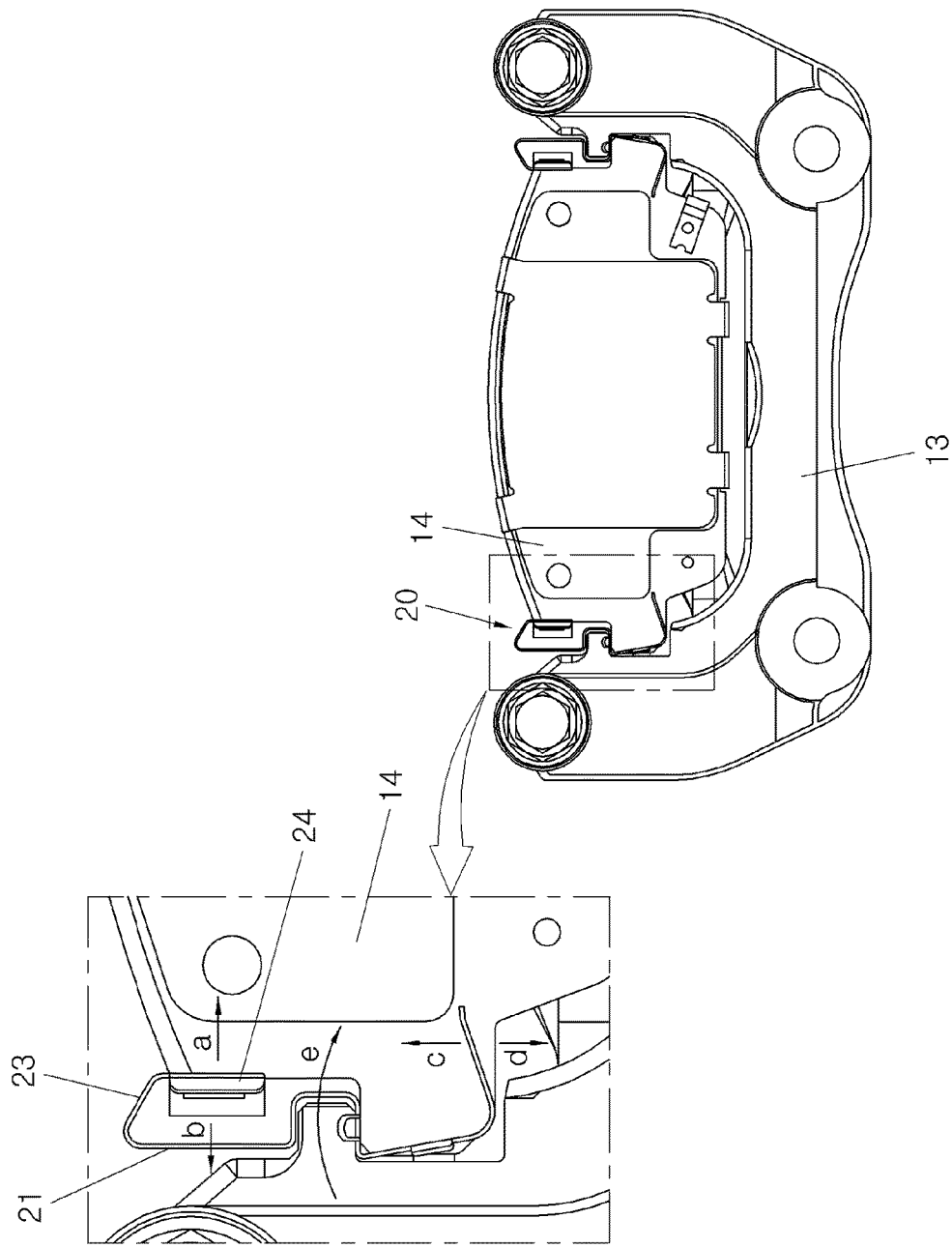
FIG. 11 is a view schematically illustrating a structure in which the pad liner for reducing drag in a brake caliper according to the embodiment of the present inventive concept supports the brake pads.

FIG. 11 shows a detachment prevention structure of the pad liner 20. The extension part 22 connected to each upper end of the pad liner 20 generates a load (a) for supporting a side surface of associated pad. Thus, a generated reaction force (b) attenuates a moment (e) formed by a reaction force (d) which is generated by a pad spring load (c) that causes detachment of the pad liner 20, thereby preventing the detachment of the pad liner 20.

In accordance with the pad liner for reducing drag in a brake caliper according to the exemplary embodiments of the present inventive concept, elastic parts provide elastic force to brake pads only in one direction in which the brake pads are spaced apart from a brake disc. Therefore, when hydraulic pressure is removed after completion of a braking operation, the brake pads are fully spaced apart from the brake disc. Consequently, it is possible to prevent a drag phenomenon due to interference between the brake pads and the brake disc.

In addition, since a main body and extension parts are arranged at intervals in the pad liner and spaces formed therebetween are opened downward, foreign substances generated according to a traveling or braking operation or by corrosion can be easily discharged to outside. Accordingly, it is possible to prevent generation of malfunction of the brake caused by deposition of foreign substances in the pad liner during the braking operation.

In addition, since the pad liner has a structure in which the upper-side extension parts thereof support side surfaces of the pads, detachment of the pad liner from a caliper is prevented by reaction force against force with which the extension parts support the side surfaces of the pads. Since the pad liner can be fixed to the caliper without using a separate locking structure, it is possible to prevent interference between the brake pads and the brake disc when assembly defect is generated and to easily perform assembly.

While the present disclosure has been described with respect to the specific embodiments, it will be apparent to those skilled in the art that various changes and modifications may be made without departing from the spirit and scope of the invention as defined in the following claims.

What is claimed is:

1. A pad liner for reducing drag in a brake caliper for a vehicle brake, in which the vehicle brake includes: a caliper in which a portion of a brake disc rotates along with a wheel; and brake pads respectively pressing both surfaces of the brake disc when a brake pedal is operated in the caliper, the pad liner comprising elastic parts which obliquely extend from the pad liner and come into oblique contact with ends of the brake pads such that the brake pads are spaced apart from the brake disc when the operation of the brake pedal is completed,
wherein the pad liner is disposed inside the caliper and provides an elastic force such that the brake pads are spaced apart from the brake disc,
wherein the pad liner further comprises: a main body defining the entire portion of the pad liner; and extension parts extending downwardly from an upper end of the main body and spaced apart from the main body, wherein the elastic parts are surrounded by the extension parts,
wherein the pad liner further comprises a connection part connecting the upper end of the main body to upper ends of the extension parts,
wherein each of the extension parts is entirely spaced apart from the main body at a predetermined distance,
wherein each of the elastic parts is inclined from the associated extension part at a set angle, and
wherein each of the elastic parts is inclined away from the extension parts to be further spaced apart from the extension parts toward an inner side of the pad liner.

2. The pad liner of claim 1, wherein the extension parts are connected to the end of the connection part in a width direction of the pad liner.

3. The pad liner of claim 1, wherein each of the elastic parts is formed by cutting a U-groove in the extension parts in a width direction of the pad liner.

4. The pad liner of claim 3, wherein the elastic part is formed by forming a U-groove at a middle portion of the extension part and obliquely bending a center portion thereof.

5. The pad liner of claim 1, wherein the extension parts support side surfaces of the brake pads such that the brake pads are spaced apart from the brake disc when the extension parts press the side surfaces of the brake pads by a constant load.

6. The pad liner of claim 1, wherein the main body has pad locking parts which are bent in a "U" form at a middle portion of the main body and are fixed to side surfaces of the brake pads.

7. The pad liner of claim 1, wherein a lower portion of a space between the extension parts and the main body is opened.

* * * * *